United States Patent [19]

Scudder

[11] 4,341,062
[45] Jul. 27, 1982

[54] COFFEE HARVESTER

[75] Inventor: Roy Scudder, Araraquara, Brazil

[73] Assignee: FMC Corporation, Chicago, Ill.

[21] Appl. No.: 170,293

[22] Filed: Jul. 18, 1980

[30] Foreign Application Priority Data

Aug. 28, 1979 [GB] United Kingdom ................. 7929833

[51] Int. Cl.³ ............................................. A01G 19/00
[52] U.S. Cl. ..................................................... 56/330
[58] Field of Search ...................... 56/330, 328 R, 329

[56] References Cited

U.S. PATENT DOCUMENTS

| 3,822,537 | 7/1974 | Sell | 56/330 |
| 3,890,774 | 6/1974 | Bruel | 56/330 |
| 4,077,193 | 3/1978 | Diggs | 56/330 |
| 4,176,511 | 12/1979 | Scudder et al. | 56/330 |

FOREIGN PATENT DOCUMENTS 2403734 5/1979 France .................................. 56/330

Primary Examiner—Robert A. Hafer
Attorney, Agent, or Firm—Louis J. Pizzanelli; Richard B. Megley

[57] ABSTRACT

This disclosure relates to a coffee harvester incorporating a mobile frame having extendable and rotatable wheel supporting hydraulic struts; opposed tined shaker with successive shaker arrays being mounted in an offset relation so that the tips trace a helix; fruit catching conveyor being propelled so that the conveying reach moves in the opposite direction but at the same speed as the harvester advances; inclining selected arrays of tines to enhance bean removal and a cleaning arrangement for removing twigs and leaves from the fruit.

8 Claims, 19 Drawing Figures

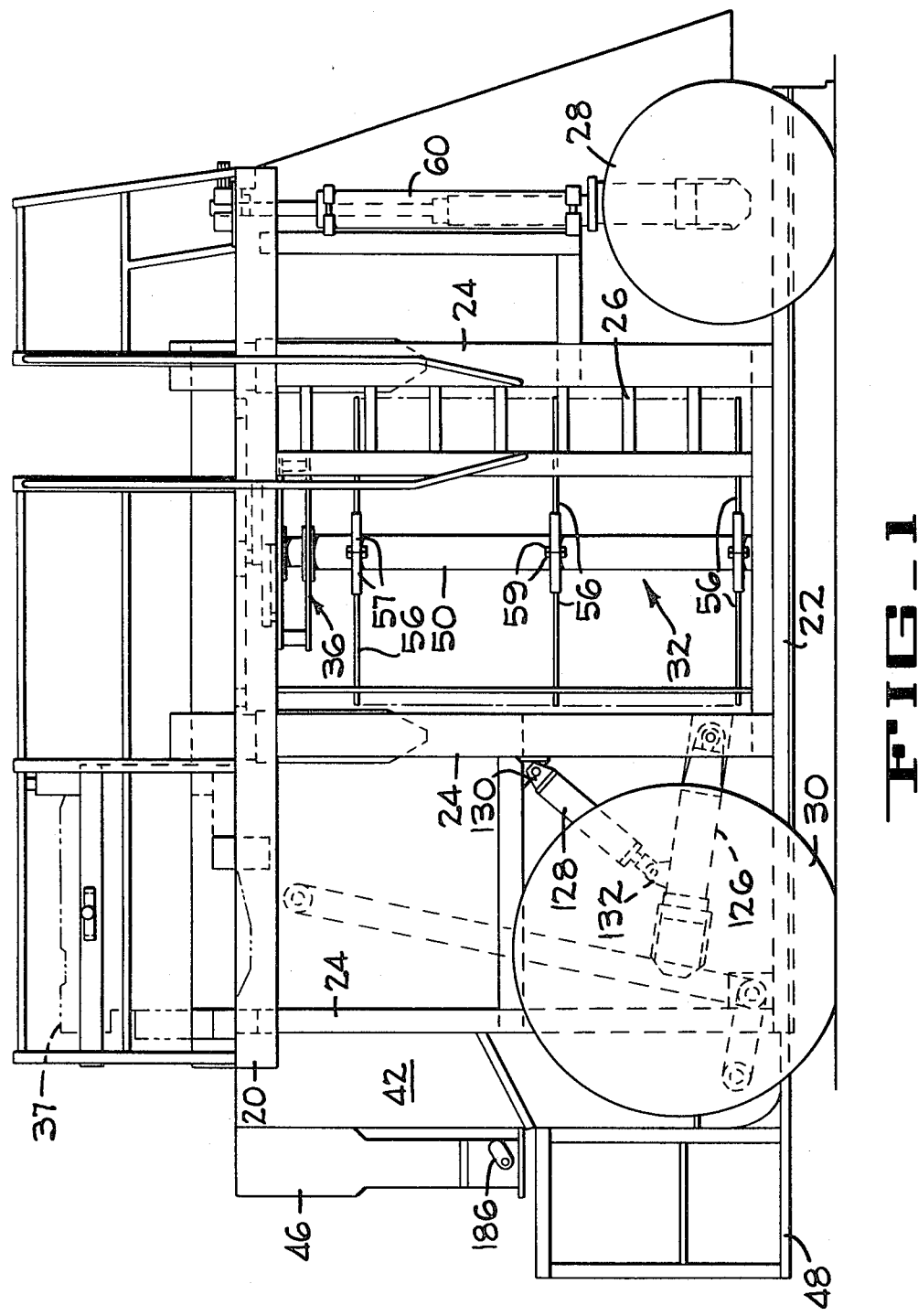
FIG_1

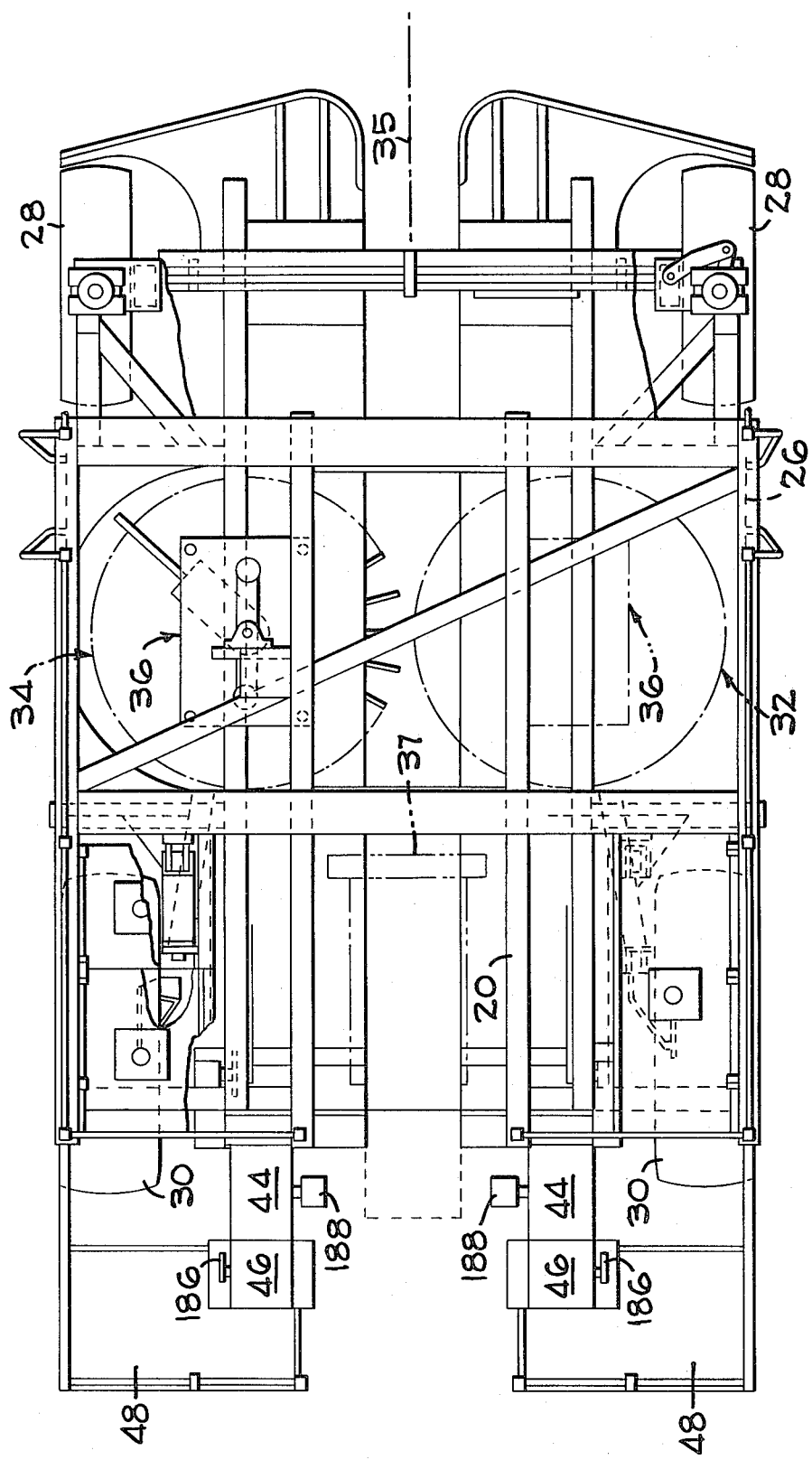

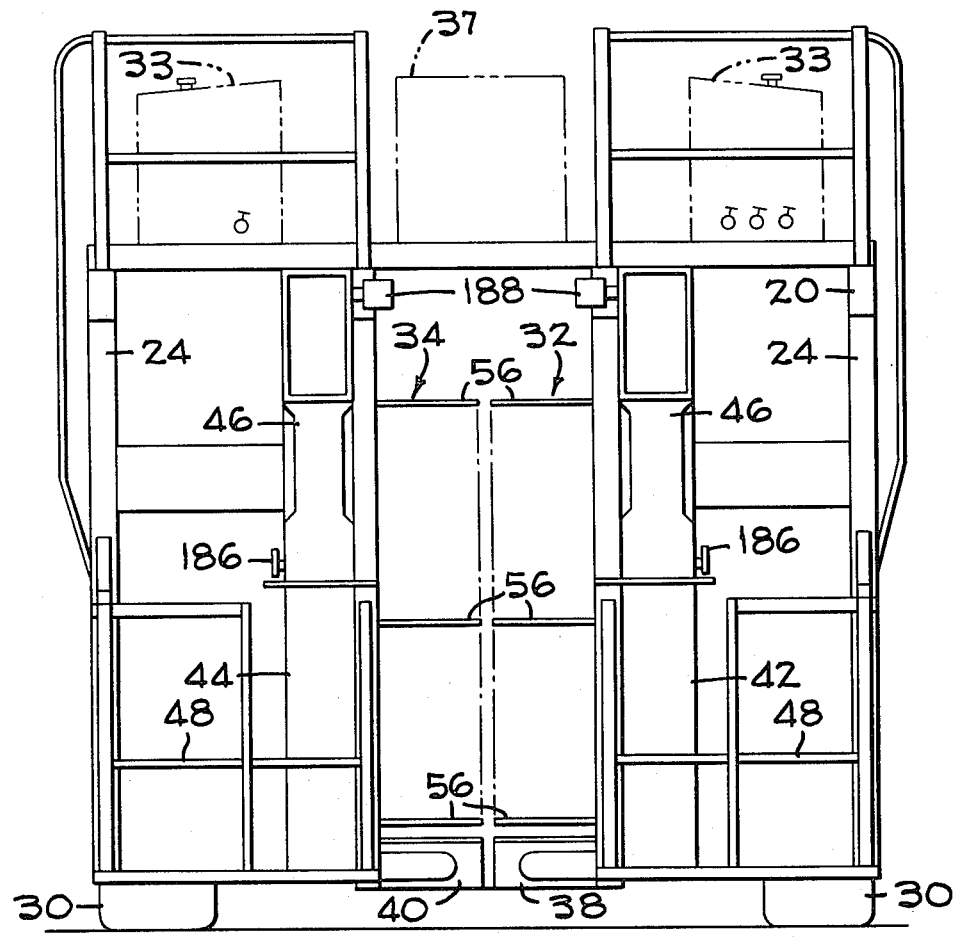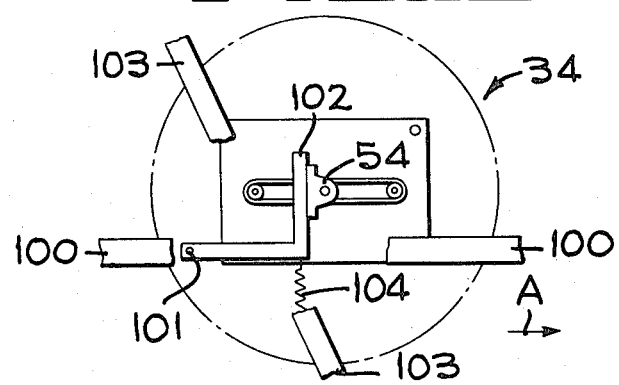

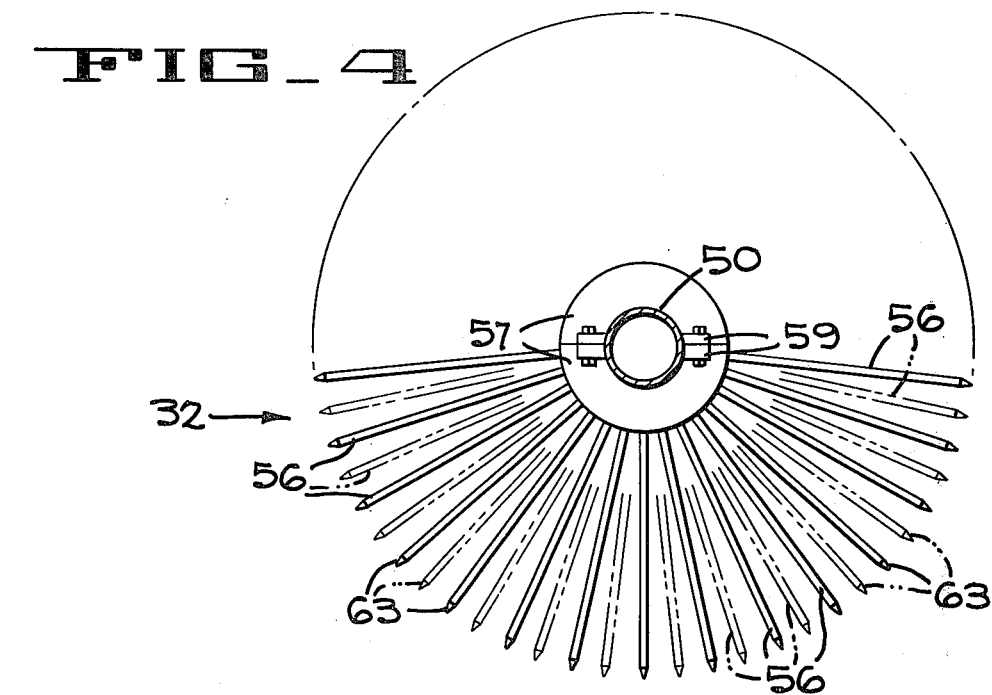
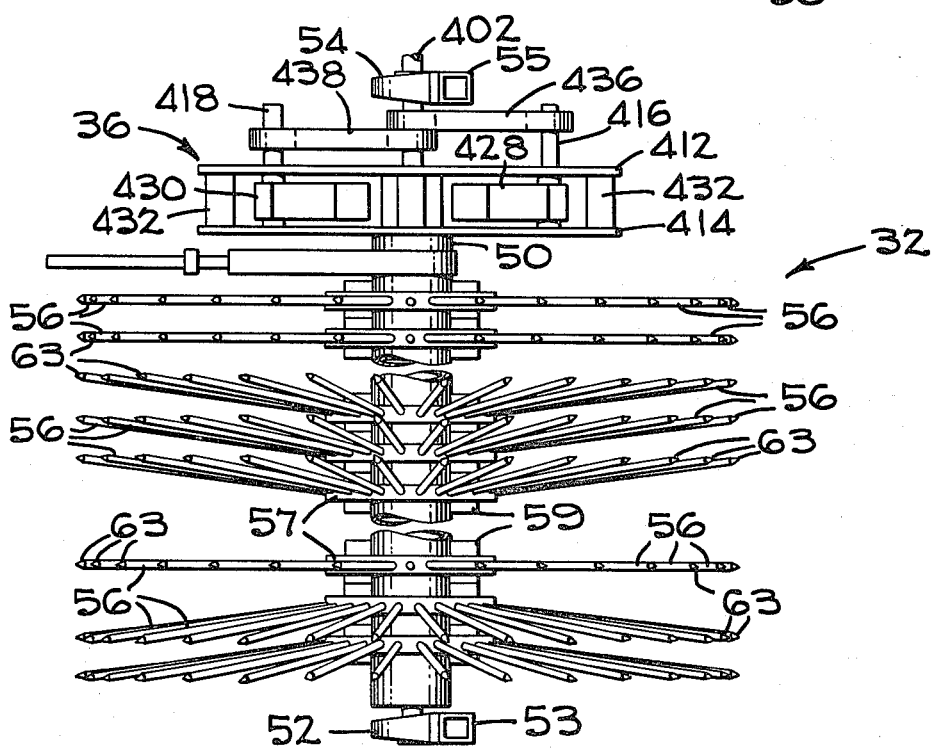

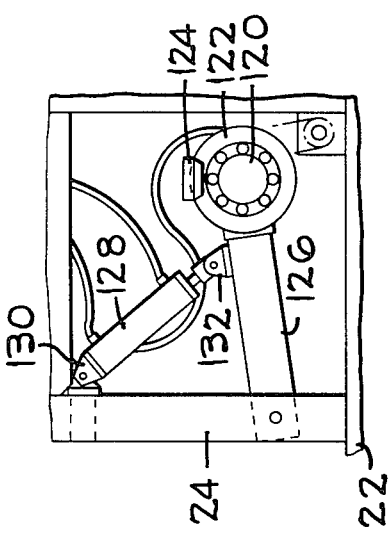
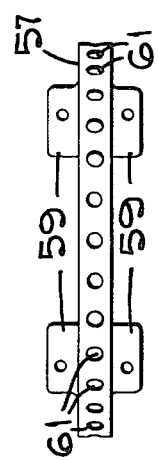
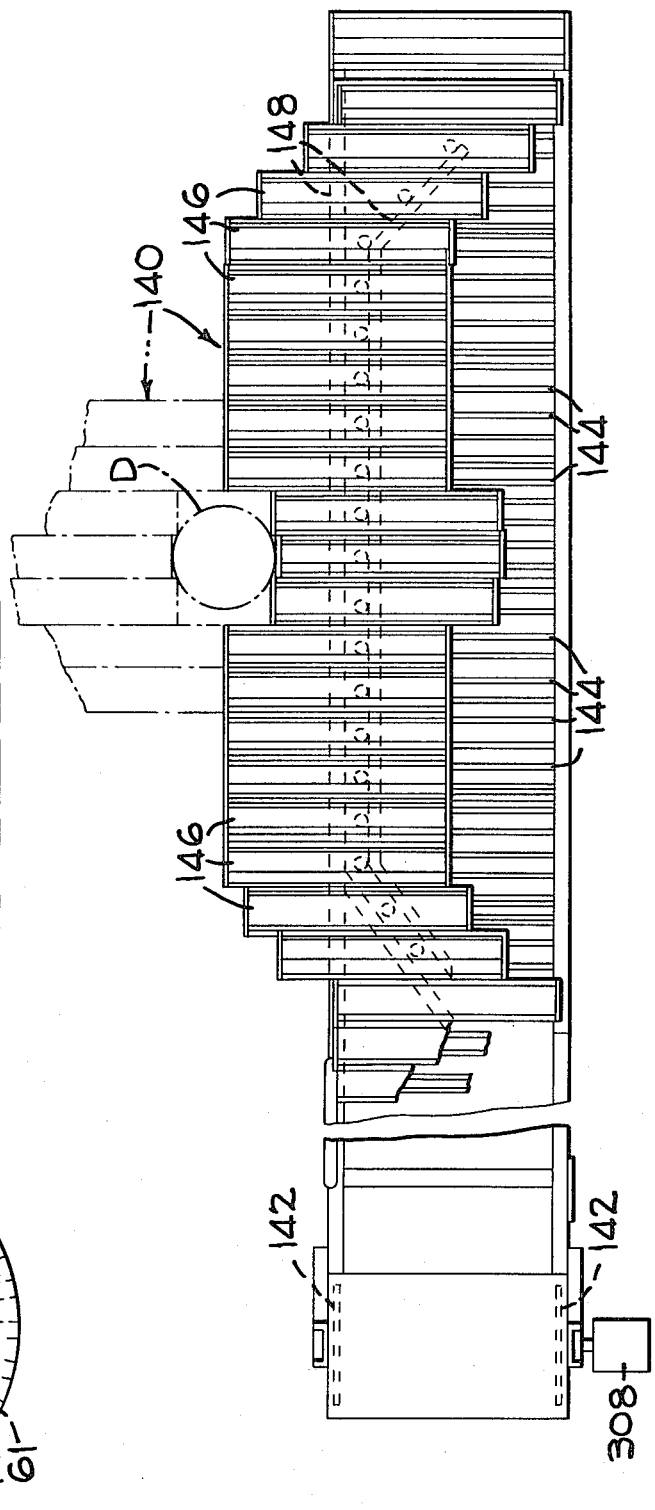

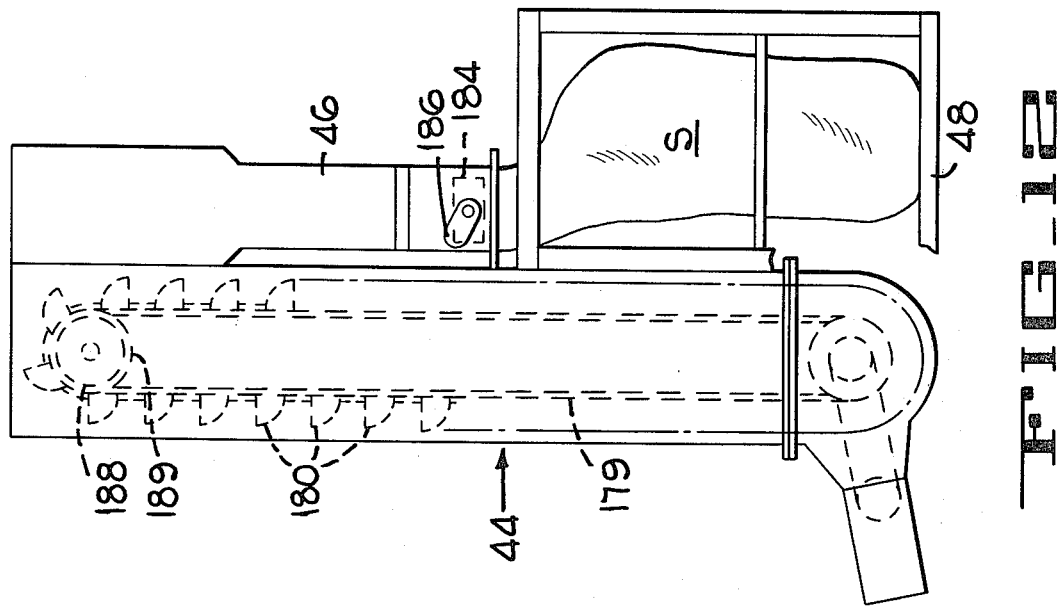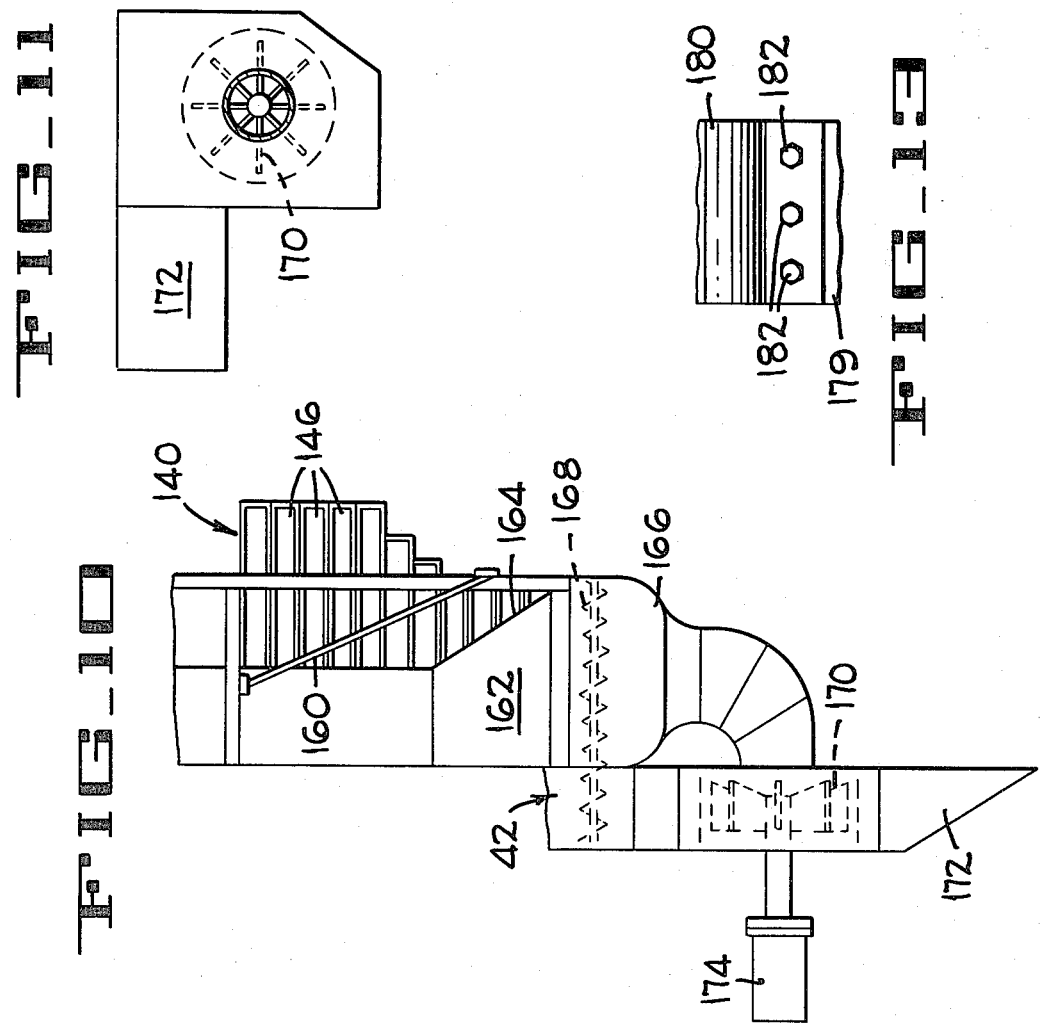

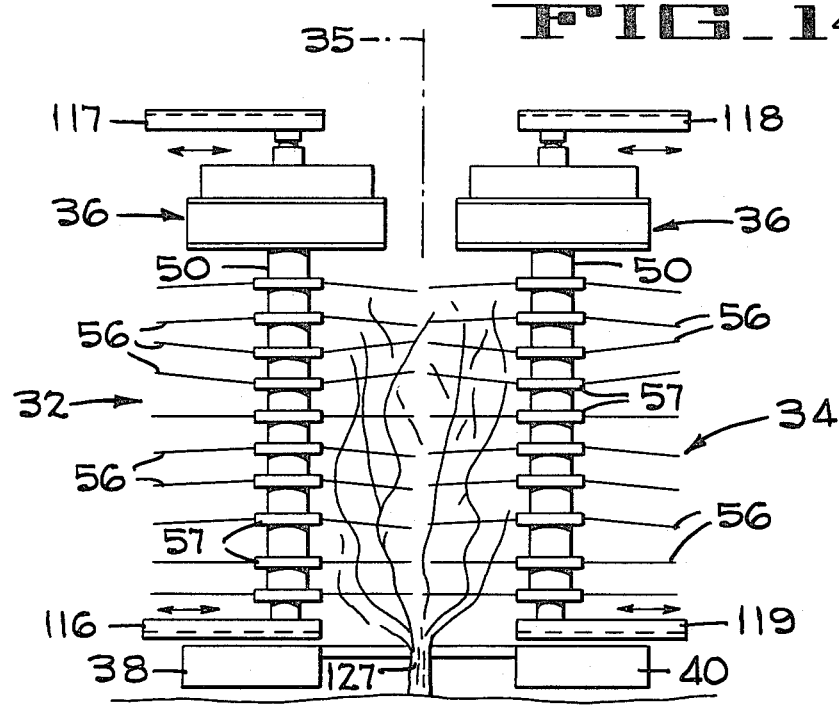
FIG_14
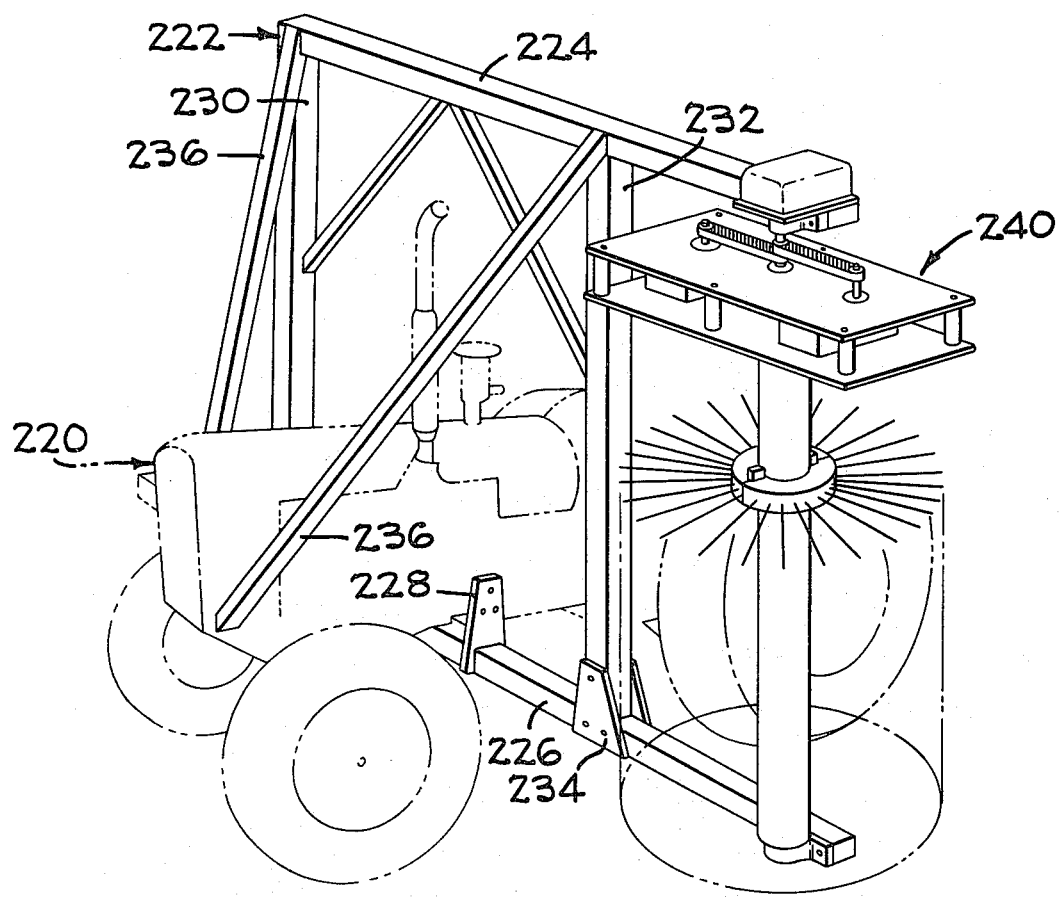
FIG_15

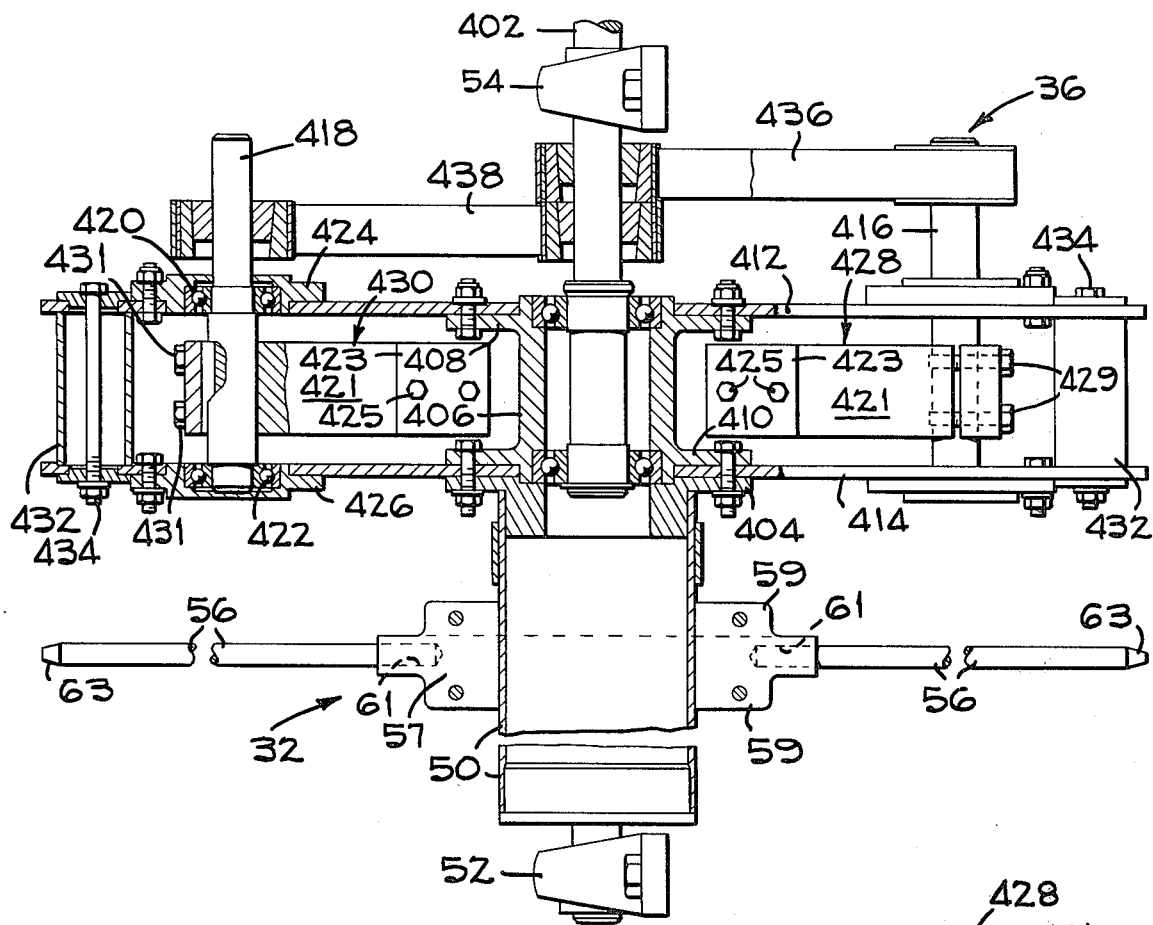
FIG_16
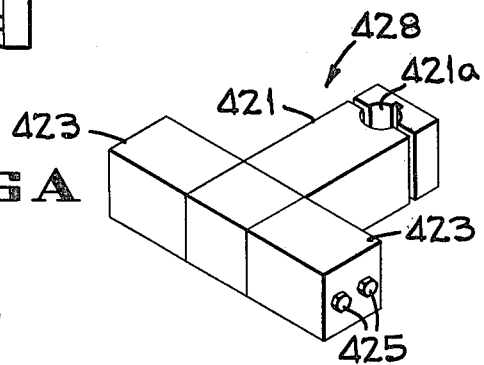
FIG_16A
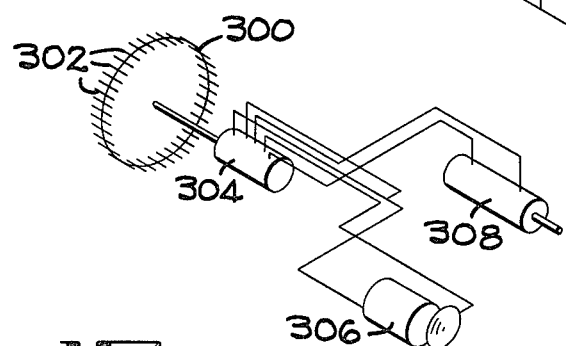
FIG_17

COFFEE HARVESTER

Over a period of at least twenty years attempts have been made to mechanize the harvesting of coffee beans. Hand picking has always been a laborious operation and even in comparatively underdeveloped countries the provision of manual labour to gather the harvest has become increasingly difficult and has been a contributory factor in the increased cost of coffee on a world-wide basis.

It is essential for machine harvesting to be successful and gain widespread acceptance that the machine should detach from the plants a high percentage of the beans, that the damage to the plants should be small and should not permanently affect the plant and that the machine should be adaptable for different varieties of plants. It is furthermore, desirable that the harvester should be capable of turning in confined spaces, capable of harvesting crops from frost damaged trees without the resultant dead twigs affecting operation of the machine and overall should be simple to service and repair under field conditions.

Previously proposed machines have failed to meet at least some of these requirements and probably the main inadequacy of such machines has been their inability to detach a sufficiently high proportion of the beans from the branches. Even comparatively experienced workers are not always successful in detaching beans from the branches when harvesting manually.

Although it is not essential to do so, it is desirable that the harvester should collect the detached beans and deliver them with a minimum of leaves, twigs and other trash to suitable containers such as sacks.

According to the present invention there is provided a coffee harvester comprising at least one rotary, oscillatory shaker incorporating a plurality of arrays of tines with each tine extending generally radially from an axis about which the oscillations are generated and means for imparting to the tines an oscillatory motion with a rate of change of velocity producing sufficient force to dislodge a high percentage of beans.

Still further according to the present invention there is provided a coffee harvester comprising at least one rotary, tined, shaker unit, drive means for oscillating the tines of the shaker unit, and tines being arranged as a plurality of arrays along the axis of the oscillations, the tines of the various arrays being inclined at at least two different angles relative to the axis of the oscillations.

Further according to the present invention there is provided the combination of an agricultural tractor and at least one shaker unit including a plurality of arrays of tines spaced along an axis, and means for oscillating the arrays about said axis.

Further according to the present invention there is provided a coffee harvester comprising at least one rotary, tined shaker unit, drive means for oscillating the tines of the or each unit with an oscillation about the longitudinal axis of the unit and means mounting the unit or units on the framework of the harvester for movement towards and away from the longitudinal centre line of the harvester.

An embodiment of a coffee harvester in accordance with the invention will now be described, by way of example with reference to the accompanying diagrammatic drawings, in which:

FIG. 1 is a side elevation of the harvester with side panels omitted;

FIG. 2 is a plan view of the harvester;

FIG. 3 is a rear elevation of the harvester;

FIG. 4 is a plan view of one shaker unit of the harvester but with an oscillatory drive omitted and only two rows or arrays shown, the lower array being shown in chain lines;

FIG. 5 is a side elevation of the shaker unit of FIG. 4;

FIG. 6 is a side elevation, to an enlarged scale, of a two-part mounting collar for one array of tines;

FIG. 7 is a plan view of the collar of FIG. 6;

FIG. 8 is a side elevation, to an enlarged scale, showing the mounting arrangement of one rear wheel, the wheel itself being omitted;

FIG. 9 is a plan view of one collecting conveyor of the harvester;

FIG. 10 is a plan view, to an enlarged scale, illustrating a rearward end portion of the conveyor of FIG. 9;

FIG. 11 is a fragmentary view, with parts omitted, of a fan arrangement forming part of the end portion of FIG. 10;

FIG. 12 is a side elevation of a bucket elevator of the harvester;

FIG. 13 shows one bucket of the elevator of FIG. 12;

FIG. 14 is an end view of a harvester with most parts omitted showing a modification in which the shaker units are movable towards and away from the longitudinal axis of the harvester;

FIG. 15 is a perspective view of an agricultural tractor with a shaker unit as illustrated, for example, in FIGS. 4 to 7;

FIG. 16 is a longitudinal section of a shaker unit head which oscillates the tines; and FIG. 16A is a perspective of the weights to effect unbalanced oscillating forces.

FIG. 17 is a diagrammatic perspective showing the circuit of a synchronising gear for the conveyor of FIG. 9.

FIG. 18 is a plan of a partial section of FIG. 2 illustrating one way in which the shaker units are mounted for in-and-out movement.

The coffee harvester in accordance with the invention will now be described in general outline with reference to FIGS. 1 to 3 of the drawings. The working parts are mounted on a frame including an upper or deck portion 20, a lower portion 22 and various uprights 24 interconnecting portions 20 and 22. Ladders 26 are provided (only one shown) to provide access to the deck portion 20. The machine is supported on two, front, steerable wheels 28 and two rear wheels 30. An engine 37 which provides power for hydraulic motors of the machine is mounted at the rear of the deck portion 20.

Two rotary and oscillatory shaker units 32, 34 are mounted symmetrically with respect to the longitudinal centre-line 35 of the machine. Rotary motion is provided by the interaction of tines of the units 32, 34 with the coffee plants as the machine progresses along a row and oscillatory motion of the shaft carrying the tines is provided by an eccentric weight arrangement 36 mounted at the upper end of each unit.

Coffee beans dislodged from the plants are collected by conveyors 38, 40, one extending along each side of the longitudinal centre line of the machine. These conveyors are fully described in U.S. Pat. No. 4,176,511 assigned to the assignee of the present application.

At the rear end of the machine bucket elevators 42, 44 (one for each conveyor) are provided which serve to lift beans collected by the conveyors to a chute 46 which discharges to a sack or other container (see also FIG. 12) supported on a platform 48.

The individual parts of the machine will now be described with reference to the remaining Figures of the drawings.

Each shaker unit 32, 34 is of robust construction since it must withstand oscillatory motion about its longitudinal axis and hence a main shaft 50 of each unit is made of thick steel supported at the lower end by a thrust bearing 52 mounted on a longitudinal member 53 of the frame and at the upper end by a journal bearing 54 mounted on a transverse member 55 of the deck portion 20.

The shaft 50 carries a total, in the preferred embodiment, of twenty-one collars each split into two halves 57 and each half having at each end face upper and lower lugs 59 by which the two halves can be secured together by bolts. The lugs also act as vertical spacers and if a relatively large spacing is required between adjacent collars the collars are mounted in abutting relationship. If a closer spacing is required the lugs of adjacent collars are non-aligned.

With reference to FIGS. 5 and 7, it will be observed that each half collar 57 has about fifteen blind holes 61 into each of which a tine 56 is introduced. The upper ten arrays of tines all extend radially outwardly from the respective collar, that is all tines of any one collar lie in the same plane. The lower set of arrays of tines (eleven arrays) are spaced from the upper set of rows by an amount slightly greater than the distance between individual rows of any one set. In addition the uppermost eight arrays have tines which are angled upwardly at an angle of about 8 degrees while remaining in a radial plane including the longitudinal axis. The lowermost three arrays of the lower set have a smaller spacing between the rows by arranging the lugs in non-abutting relationship. The tines of the top one of the arrays of these three arrays extend radially outwardly, or in other words collectively lie in a plane whereas the tines of the lowermost two arrays are inclined downwardly at an angle of approximately 8 degrees to the horizontal while each lies in a radial plane including the longitudinal axis of the shaker.

Each tine 56, in the preferred embodiment is about 57.5 cm long and is secured in the corresponding blind bore 61 of its collar 57 with an epoxy resin. The tip portions 63 are frusto-conical to assist penetration between branches of a plant. The tines are of glass fibre.

Although a specific arrangement has been shown and described, it will be apparent that other tine array configurations can be used. The one shown has been successful in harvesting mature crops as well as relatively green crops and is capable of removing at least about 95% of the crop without appreciable damage to the plants themselves. The angular orientation of the tine arrays will depend upon the growth pattern of the plants to be harvested, and preferably the tines at any given level will not be parallel to plant branches at that level.

The drive arrangement 36 includes eccentric weights of a selected configuration so that they generate high amplitude displacement of the tines. This higher displacement is achieved by providing assembled T-shaped blocks whose mass can be easily changed to provide variations in displacement.

To achieve satisfactory removal of coffee beans from the plants both when fully mature and when relatively green it is necessary that the maximum acceleration of the tines should be between 25 and 30 g's. It is also important that the tines should have the correct degree of rigidity and a diameter of about 2.0 cm when made of glass fibre has been found adequate. The tines should be sufficiently rigid to prevent flexing along the length which absorbs energy and reduces the efficiency of detachment. However, over-rigid tines are more liable to damage the plants. The amplitude of oscillation is 4.5 cm in the preferred embodiment and the frequency 1000 c.p.s. The amplitude may be greater in some harvesting conditions and the frequency can be varied over a range from 800 to 1300 c.p.s.

The overall diameter of each shaker unit should be large, say of the order of 1.20 m to 1.8 m; in the preferred embodiment the diameter is approximately 1.5 m. The reason for the choice of diameter is that if the diameter is too small the tines remain in the plants for too short a period. Diameters in excess of 1.8 m result in an unwieldy harvester with no compensating benefit.

The oscillation generator to be described with reference to FIG. 16 provides the desired operational parameters and the nature of the construction is such that if a tough branch is encountered the amplitude of oscillation is automatically reduced while the frequency and maximum acceleration are not unduly adversely affected.

With reference to FIGS. 14 and 16 it will be seen that each shaker unit 32, 34 has an oscillation generating means or head 36 which serves to oscillate the tines. An input shaft 402 of the head is driven by an hydraulic motor (not shown) and is supported by the upper bearing 54 mounted on the upper part 20 of the harvester frame and a lower bearing (preferably a thrust bearing) 52 mounted on the lower part 22. As previously described, the tine arrays 56 are mounted on a tubular shaft 50 and this is secured at its upper end to a flange 404 bolted to a central bearing housing 406 of generally cylindrical form co-axial with the shaft 402 and the tube 50. The housing 406 has upper and lower annular flanges 408, and 410 which serve to secure an upper rectangular plate 412 and a lower rectangular plate 414. A pair of ball bearings is interposed between the shaft 402 and the bearing housing 406.

The rectangular plates 412, 414 carry two stub shafts 416, 418 rotatably supported in upper and lower bearings 420, 422 carried in bearing housings 424, 426. Each stub shaft 416, 418 has keyed to it between the plates 412, 414 a T-shaped weight 428, 430 details of which are shown in FIG. 16A. The weights comprise a central block 421 formed with a keyed bore 421a. Laterally extending weights 423 are releasably attached by bolts 425 to the opposite sides of block 421 to form the T-shaped configuration. Changes in amplitude is achieved by merely changing the weights 423. The weights are clamped by bolts 429, 431 as well as being keyed to ensure that the weights are tightly held on the stub shafts 416, 418. Four tubular spacers 432 are located between the plates 412, 414 one at each corner thereof and a nut bolt and washer assembly 434 serves to clamp the spacers between the plates. The spacers are, of course, disposed so that they do not interfere with rotation of the weights. All the nuts used in the assembly are lock nuts because the acceleration forces are high with consequent risk of slackening. The shaft 402 drives the stub shafts 416, 418 through toothed belts and pulleys 436, 438.

The T-shape form of the weights 428 and 430 displace the centers of gravity as far as reasonably possible from the respective stub shaft to thereby increase the acceleration during each oscillatory cycle.

The rear wheel assembly illustrated in FIG. 8 incorporates an hydraulic motor 120 mounted in the hub and a disc brake 122 is operative with an hydraulically operated caliper 124. The wheel (omitted to allow other parts to be shown) is mounted on one of the uprights 24 of the frame through a pivotal beam 126, the location of which is controlled by a double-acting hydraulic pressure cylinder 128. The cylinder 128 is secured by a clevis 130 to the upright and at the other end by a clevis 132 to the beam 126 adjacent the wheel hub 120. The angular location of the beam 126 is under the control of the operator of the vehicle as is the control of the forward hydraulic cylinders 60.

Both the forward cylinders 60 and the rearward cylinders 128 are designed to provide some resilient movement as well as to correct the orientation of the harvester according to transverse and fore-and-aft ground slopes. The hydraulic circuits which control the operation of the cylinders are conventional and therefor need not be described. The hydraulic fluid is held in reservoirs 33 (FIG. 3).

Referring now to FIG. 9, it will normally be a requirement of the farmer that detached coffee beans will be collected rather than allowed to fall on the ground and to provide for this two longitudinally-extending conveyors 140 are provided, one below each shaker unit and one of the conveyors, described in detail in U.S. Pat. No. 4,176,511 is shown in FIG. 9. A part of the other conveyor is shown in chain lines and an obstruction such as the centre of a plant is indicated at D.

The conveyor 140 comprises two drive chains (not shown) driven through sprocket wheels 142 (broken lines). The chains carry pairs of guide rods 144 which, in turn, carry rectangular shallow trays 146 which serve as the conveying carriers. On the lower run, the trays 146 lie centrally between the chains but on the upper run the trays are guided inwardly towards the centre line 35 of the harvester by cam tracks 148 which cooperate with cam followers (not shown) on the trays in the form of sleeves lined with nylon bushings. Springs bias the trays towards the cam tracks, so that contact with an obstacle overcomes the spring force and the corresponding cam follower moves away from the cam track. The cam tracks must be rigid to avoid deflection by the resistance offered by the plants.

When harvesting coffee plants which are either old or have been the subject of frost damage, the shaker units are liable to break off brittle twigs as well as shake off the beans and the trays collect these and transport them to the rear ends of the conveyors. The subsequent delivery of the beans to sacks is hindered by the presence of twigs and other trash and to avoid problems in the bucket elevators a deflector blade 160 (FIG. 10) angled across the trays serves to deflect twigs and trash from the tops of the trays to the ground. A further deflector plate 162 has an edge portion 164 which acts in the same manner.

In order to remove leaves and other lighter trash a casing 166 is mounted at the zone where the conveyor discharges the beans to an auger 168 which in turn delivers to the lower end of the bucket elevator 42 (FIG. 1). The casing is connected through a short length of ducting to the inlet of a fan 170, the outlet of which discharges leaves and other trash through an outlet 172. The fan is driven by an hydraulic motor 174 and maintains a suction sufficient to remove trash but leaves beans to fall into the auger.

The bucket elevator 44 illustrated in FIG. 12 consists of a conveyor belt 179 with evenly spaced triangular section buckets 180 secured to the belt by nuts and bolts 182. The buckets discharge into the chute 46, the lower end portion of which houses a flap valve 184 manually controlled by a handle 186. The valve is used when a full sack is to be exchanged for an empty one. The elevator is driven by an hydraulic motor 188 at a top end sprocket 189. The bucket elevator also acts as a transmission belt to drive the auger 168. A device to grip a sack S and hold it at the lower end of the chute 46 is provided at the lower end of the chute.

In order to reduce further the risk of damage to the plants, and to enhance the harvesting capability, the shaker units hereinbefore particularly described or modifications thereof may be mounted in guide tracks as illustrated in FIG. 14. Each shaker unit is generally similar to that already described in detail with reference to FIGS. 5, 6 and 7 although the angular configuration of the tines 56 differs, by way of illustration of possible modifications, to suit coffee plants with a different growth pattern.

Guide tracks 116, 117 and 118,119 serve to guide the shaker units towards and away from the centre line 35 of the harvester and this centre line will normally coincide with the centre line of the row of plants 127. The motion may be effected by one or more hydraulic actuators (not shown) operating on each shaker unit and such actuators may be controlled by appropriate sensors and a servo-system to cause the shakers to move around one half of the periphery of each plant.

It is also possible merely to spring-load each shaker unit towards the plants 127 so that the shakers move transversely automatically as the resistance offered by the plants varies.

One manner in which the shaker units may be mounted for in-and-out movement is shown in FIG. 18 and will be described with respect to shaker unit 34. The upper inboard longitudinal frame member 100, which is partly broken away, has pivotally connected at 101, a right angle bracket 102 to which is rigidly connected pillow block bearing 54. An angled cross tie frame member 103, which is also shown broken away, has one end of a spring 104 clamped thereon and the other end fixed to the bracket 102. As the machine moves in the direction of arrow A and the arrow is placed to represent the longitudinal center of the machine, the shaker unit 34, on encountering a plant or tree, is able to pivot outwardly about the pin 101 and accordingly accommodate plants of various lateral dimensions and yet maintain desired tine penetration. It is to be understood that the upper and lower bearings 54 and 52 of each shaker is mounted as shown in FIG. 18. In an alternative, unillustrated construction, each shaker unit is mounted for limited swinging movement towards and away from the centre line 35. As for the illustrated construction, motion may be controlled positively by hydraulic actuators or by springs or any other means which will control movement with respect to the longitudinal centre line 35.

Although in the preceding text reference has been made primarily to a harvester which applies forces to both sides of a coffee plant simultaneously, under some circumstances, for example when it is not desired to collect beans which have been detached from the plants, a shaker unit can be mounted on a conventional tractor as illustrated in FIG. 15. This Figure shows a conventional agricultural tractor 220 (chain lines) carrying a frame 222 of box-section members, including two transverse members 224, 226, the lower one 226 of which is secured to the tractor by brackets 228 (only one shown) and the upper one 224 of which is supported by two uprights 230, 232, connected by plates 234 and bolts to the lower transverse member. Bracing struts 236 are provided between the uprights and the upper transverse member 224, and between the junctions of the uprights and the upper transverse member on the one hand and the front end of the tractor 220 on the other hand.

As shown, the frame carries only one rotary shaker unit 240 or may carry two units arranged symmetrically on one side and the other of the tractor. In either construction, each rotary shaker unit is supported on laterally overhanging parts of the upper and lower transverse members.

The conveyor illustrated and described with reference to FIG. 9 can be synchronized to remain stationary with respect to the plants by a synchronizing system described and claimed in U.S. Pat. No. 4,176,511. Alternatively, a system as illustrated in FIG. 17 can be employed and this has the advantage of greater simplicity. An unloaded ground wheel 300 having lugs 302 adjacent its periphery drives through a sprocket and chain drive, a hydrostatic metering valve 304, the output of which is directly proportional to ground speed. The metering valve receives pressure hydraulic fluid from a pump 306 and delivers the fluid to the hydraulic motors 308 which drive the conveyors. The circuit is provided by the lines indicated.

A suitable hydraulic metering valve is manufactured by TRW Ross Gear Division of 800 heath Street, Lafayette, Indiana, U.S.A., 47902 and marketed under the designation HGA 20.

In operation, the harvester is positioned to straddle a row of coffee plants and then advanced along the row with the longitudinal centre line 35 of the harvester substantially coincident with the centre line of the row. The conveyor synchronizing wheel 300 is lowered to contact the ground and this controls motion of the conveyors so that the rearward speed of the upper, bean-collecting, run is exactly matched to the forward speed of the machine as a whole. The trays 146 of the conveyors meet or substantially meet on the centre line of the machine except where a part of a plant prevents this. There is no longitudinal movement (i.e. in the direction of advance of the harvester) of the trays relative to the plants and hence no damage to conveyor or plant can occur while at the same time relatively few beans are lost owing to substantially complete ground coverage by the two conveyors.

Beans collected by the conveyors are passed through the cleaning arrangement including the deflectors for removing twigs and through the augers to the bucket elevators. The beans are delivered to the chutes and loaded into bags gripped at the lower ends of the chutes by the gripping means (not shown). The rate of advance of the harvester along a row is normally one kilometer per hour, but may be as high as 3 kilometers per hour. The loss of crop and green leaves is small, although frost-damaged or otherwise dead leaves are generally removed which is beneficial as these are liable to harbour grubs, insects and spiders.

Although the best mode contemplated for carrying out the present invention has been herein shown and described, it will be apparent that modification and variation may be made without departing from what is regarded to be the subject matter of the invention as defined in the appended claims.

What is claimed is:

1. In a harvesting machine for harvesting crops growing on plants such as trees, bushes, canes, vines or the like, having stalks growing from the ground, said harvester having frame means, means for advancing the harvester in a direction along a row of stalks, means on said frame means for dislodging crops from the plants, endless conveyor means on said frame means having laterally spaced endless flexible side conveyors which straddle the crop along a crop receiving reach, means for driving said conveyors for moving said reach in a conveying direction opposite to the advance direction of the said harvester and having a zero speed relative to the ground, a row of individual crop catching and conveying trays mounted on each of said side conveyors; the improvement in said means for dislodging said crop comprising a rotatable central shaft mounting sets of axially spaced generally radially extending tine arrays where in each array the tines are regularly circumferentially spaced, split hubs releasably secured to said central shaft and formed with a plurality of bores in which the tines are fixed, said bores in certain hubs defining an acute angle with respect to the axis of said central shaft so that the tines fixed therein are correspondingly inclined with respect to the axis of the central shaft.

2. A harvester according to claim 1 wherein one or more arrays of tines at the longitudinal mid-portion of said central shaft are contained in a plane normal to the axis of said shaft while certain tine arrays spaced from the mid-portion are angled toward the ends of said central shaft.

3. The harvester according to claim 1 wherein at least one tine array adjacent either end of said central shaft are contained in a plane normal to the axis of said central shaft.

4. In a mobile harvesting machine movable along a path for detaching crops growing on plants such as trees, bushes, canes or vines or having stalks growing from the ground, said harvester having a frame mounting crop dislodging means including a pair of laterally spaced shafts mounting an array of generally radially extending circumferentially spaced tines that penetrate the side of the plants to effect removal of the crop product;

the improvement in said dislodging means comprising:
axially spaced shaft supports for each said shaft mounted to the harvester frame for movement transverse to the axis of the shaft;
said supports each having a bearing in which said shafts are rotatably mounted, and,
power-driven means for moving each said shaft and its said supports transversely toward and away from each other thereby to repetitively insert and withdraw said tines into and from said plants to dislodge the crop as the harvesting machine moves along its path and as said shafts rotate as the tines engage the plants.

5. The harvesting machine according to claim 4 wherein each said support is moveable in linear guides disposed transversely to the longitudinal axis of the machine so that penetration of said dislodging means into the plants can be varied in accordance with the diameter of the plant.

6. The harvesting machine according to claim 4 wherein each said support is connected to links pivotally connected to the harvester frame, and springs urging said links toward the longitudinal axis of the machine thereby permitting additional yielding lateral outward or inward movement of said dislodging means in dependence on the diameter of the plant.

7. The harvesting machine according to claim 4 further comprising means for cleaning the crops including a conveyor for receiving crops and extraneous material such as leaves and twigs removed by said dislodging means, at least on deflector blade extending closely adjacent the conveying reach of said conveyor and serving to defect twigs and trash to the ground, means for transferring and elevating the crops and remaining trash to a vertical chute discharging into a sack or other container for accumulating cleaned crops, and means at the transfer zone for creating air currents entraining and removing the remaining trash before reception by the container.

8. In a harvesting machine for harvesting crops growing on plants such as trees, bushes, canes, vines or the like, having stalks growing from the ground, said harvester having frame means, means for advancing the harvester in a direction along a row of stalks, means on said frame means for dislodging crops from the plants; the improvement in said dislodging means comprising shaker units mounted on the frame to engage opposite sides of the plants, each of said shaker units comprising an elongate rotatable shaft and a series of radially extending circumferentially spaced tine arrays mounted along the length of said shaft, certain one of said tine arrays above and below the midportion of said shaft being angled, respectively, upwardly and downwardly so that a surface containing the tines defines a shallow cone, and means mounting said shafts to move inwardly and outwardly relative to the longitudinal axis of the frame so that the tine arrays may describe a path determined by the spacing and the horizontally projected contour of the plants.

* * * * *